April 13, 1954 W. A. MALTHANER ET AL 2,675,538

CHECKING CIRCUIT

Filed March 5, 1953

INVENTORS W. A. MALTHANER
D. H. RING
BY
[signature]
ATTORNEY

Patented Apr. 13, 1954 2,675,538

UNITED STATES PATENT OFFICE 2,675,538

CHECKING CIRCUIT

William A. Malthaner, New Providence, and Douglas H. Ring, Red Bank, N. J., assignors to Bell Telephone Laboratories, Incorporated, New York, N. Y., a corporation of New York Application March 5, 1953, Serial No. 340,473

16 Claims. (Cl. 340—149)

Figures 1, 2:
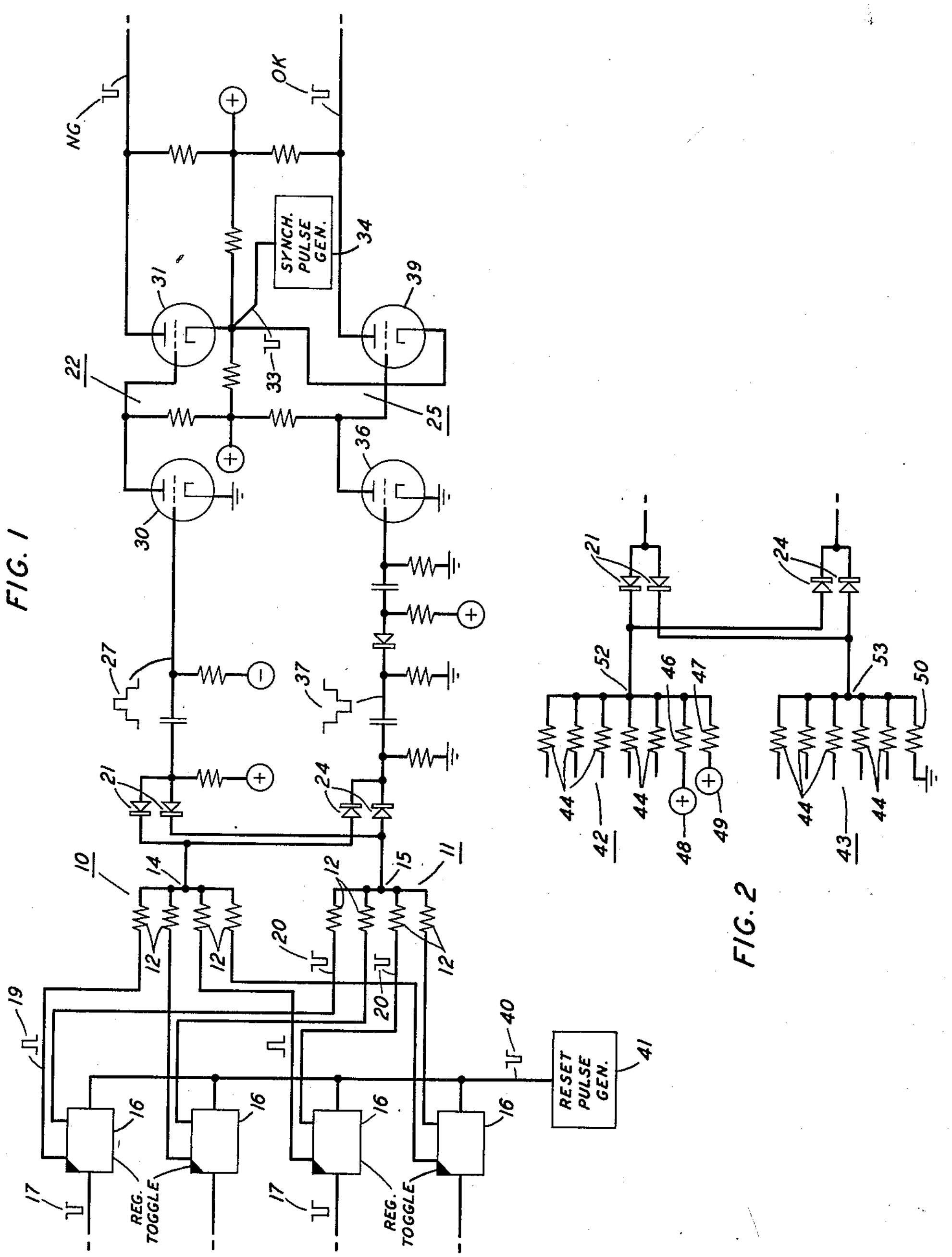

This invention relates to electrical circuits and more particularly to the checking of coded information in such circuits.

In various electrical systems, such as may be employed in computers, telephone switching control systems, etc., information is transferred in the form of pulses appearing, in accordance with a predetermined code, simultaneously on a number of parallel leads. Such a system, which may be designated as a parallel operating system, requires that at various stages of the operations the coded information be checked to determine that it is expressed in the code adopted. Thus, it is generally desirable to ascertain before the information is transmitted to any work circuits that it is plausible in terms of the code; in a specific example, if the information is in a two-out-of-five code, information appearing in a three-out-of-five code is in error and should not be given to the work circuits.

One such parallel operating system wherein checking of coded information is advantageous is the telephone system described in application Serial No. 340,471, filed March 5, 1953, of W. A. Malthaner and H. E. Vaughan.

Priorly fairly complex vacuum tube circuits have been utilized to ascertain that the information being transmitted is in proper and possible form. Further these prior circuits have operated on slight margins and with a high possibility of incorrect signals.

It is a general object of this invention to provide improved checking circuits for parallel operating systems.

More specifically objects of this invention include simplifying such circuits, and increasing the size of the codes that may be checked by such circuits without increasing the complexity of the circuits.

These and other objects of this invention are attained in a specific illustrative embodiment of this invention wherein two summing networks of resistors are provided, each network including a resistor for each possible pulse in the code being checked. Each resistor of the one network may be considered as paired with a resistor of the other network. When a code appears as a number of pulses on the parallel leads, a register toggle circuit is triggered for each pulse and provides a positive going voltage step to a resistor of the first summing network and an equal negative going voltage step to the paired resistor of the second summing network. Initially each resistor of the first network has a certain voltage applied to it and each resistor of the second network has a certain higher voltage applied to it so that the appearance of these pulses at certain resistors causes the voltage at the common point of the one network to increase and the voltage at the common point of the other network to decrease.

The two common points are connected together through two pairs of varistors or other unidirectional current elements to two comparator circuits. One pair of varistors are poled so as to allow passage therethrough of only the lower of the voltages at the common points of the summing networks. In this case the comparator circuit is so biased that it will be operated on only the maximum possible voltage step from the common points, which occurs when the voltages at the common points of the summing networks are equal. Thus when exactly half the register toggles are tripped, the comparator circuit is triggered, indicating a correct code. Advantageously this comparator circuit may be arranged so as to generate a no-good or incorrect code pulse when a synchronized pulse is applied to it and the comparator circuit has not been operated.

The other pair of varistors are poled so as to allow passage therethrough of the higher of the two voltages at the common points of the summing networks. In this case the comparator circuit is biased so that it will be operated on only the minimum possible voltage step from the common points, which again occurs when the voltages are exactly equal at the common points of the summing networks. Advantageously this comparator circuit may be arranged so as to generate an OK or correct code pulse when a synchronized pulse is applied to it and the comparator circuit has operated.

For $x$-out-of-$n$ codes in which $x$ is not half of $n$, dummy channels are provided in each summing network to translate the code to one in which a correct code is indicated by voltage pulses at exactly half the resistors in the summing networks. These dummy channels provide additional artifical lines which appear either always or never to have code pulses present on them.

Features of this invention thus include the employment of summing networks each having a resistor for a possible pulse in the coded information message to be checked, the resistors of one network being paired with those of the other; increasing the voltage at the common point of one of the summing networks and decreasing the voltage at the common point of the other summing network in response to the appearance of the pulses in the information message being checked; and applying only the lower or higher of the two voltages at the common points to a comparator network which is biased to be triggered only when the voltages at the common points are equal, indicating correctly coded information message.

It is a further feature of certain embodiments of this invention that dummy channels are provided to translate the code being checked into one in which a correct code is indicated by the presence of voltage pulses at half the resistors of the summing networks.

These and other desirable features of this invention may be completely understood from consideration of the following detailed description and the accompanying drawing, in which:

Fig. 1 is a schematic representation of one illustrative embodiment of this invention for checking information in a two-out-of-four code; and Fig. 2 is a schematic representation of the summing networks of another specific embodiment of this invention for checking information in a two-out-of-five code.

Turning now to the drawing, one specific illustrative embodiment of this invention for checking two-out-of-four codes is depicted in Fig.1. As there seen, two summing networks 10 and 11 each comprise equal resistors 12. The one end of each of the resistors 12 of network 10 is connected at a common point 14 and the one end of resistors 12 of network 11 at a common point 15. The summing resistors 12 of network 10 are each connected at their other end to the normally saturated plate of a register toggle 16 while the summing resistors 12 of network 11 are each connected at their other end to the normally cut-off plate of the register toggles 16.

The information message to be checked comprises, in this specific embodiment, negative pulses 17 which are applied to the register toggles 16 to trip these toggles. The operation of the toggles 16 and the summing networks 10 and 11 can most readily be appreciated from considering specific values which are to be understood, of course, as merely exemplary of one specific embodiment of this invention and in no way limiting the invention. When the toggles 16 are all in their normal or untripped condition a positive voltage, which in our illustrative case we may consider as 90 volts, is applied to each of the summing resistors 12 of network 10, and a positive voltage of 150 volts is applied to each of the summing resistors 12 of network 11. When two negative pulses 17 are applied to two of the toggles 16, these toggles are tripped and positive-going pulses 19 are delivered to network 10. These pulses 19 may be about 60 volts so that the voltage applied to two of the resistors 12 of the network 10 is raised to 150 volts.

At the same time negative-going pulses 20 are delivered from the toggle registers 16 which have been tripped by pulses 17 to the resistances 12 in the summing network 11 paired with those in network 10 to which voltage steps 19 have been applied. These pulses may also be about 60 volts, so that the voltage applied to two of the resistors 12 is decreased from the 150 volts normally applied thereto to 90 volts.

The voltage at the common point 14 or 15 of the summing networks 10 and 11 will therefore be dependent on the number of toggles 16 that have been tripped.

The voltages at the common points 14 and 15 are applied through a first pair of varistors or unidirectional current elements 21 to a first comparator circuit 22 and through a second pair of varistors or unidirectional current elements 24 to a second comparator circuit 25. Considering now the operation of the first comparator circuit 22 only, the varistors 21 are poled so as to allow passage therethrough from the common points 14 and 15 the lower of the two voltages at these points. Therefore the possible voltages that may be passed by these varistors 21 are indicated by the voltage steps 27, each step to the right being representative of the voltage on the tripping of another toggle. When no pulses 17 are applied to the toggles, which we may consider a zero-out-of-four code, none of the toggles is tripped and the voltage passed by the varistors 21 is, in the specific embodiment, 90 volts, the voltage at point 14. As the number of toggles tripped increases, the voltage passed by varistors 21 will first increase and then decrease in increments of substantially 15 volts as the number of toggles tripped increases. Thus for the correct two-out-of-four code the voltage passed by varistors 21 will be 120 volts while for an incorrect one-out-of four or three-out-of-four code the voltage will be 105 volts, the voltage either at point 14 or point 15 This is because, in the specific embodiment we are considering by way of example, the resistors 12 of the summing network 11 will have 150 volts applied to them when the toggles 16 are in their normal or untripped condition. Thus for an $x$-out-of-$n$ code the voltage at point 14 will rise in steps of $V/n$ volts for each toggle tripped, where V is the amplitude of the positive voltage pulse when the toggles are tripped, and the voltage at point 15 will decrease in steps of $V/n$.

The voltage passed by the varistors 21, which will be one of the voltage steps indicated by 27, is applied to the grid of a normally non-conducting triode 30. Triode 30 is so biased at cut-off that only the maximum voltage step that may be passed by the varistors 21, when the voltages at the points 14 and 15 are equal, will cause it to conduct. When triode 30 conducts the voltage applied to the grid of a triode 31 is reduced, preventing conduction in triode 31. In order to ascertain whether the information being checked is plausible a checking or synchronizing pulse 33 is applied from a synchronizing pulse generator circuit 34 to the cathode of triode 31. If triode 30 is not conducting when pulse 33 is applied to the cathode of triode 31, then the bias applied to the grid of triode 31 is such as to allow triode 31 to conduct and generate an incorrect code pulse NG in its plate circuit. If however triode 30 is conducting when pulse 33 is applied, then the bias on the grid of triode 31 prevents triode 31 conducting and no pulse NG will be generated.

Instead, in this specific embodiment of the invention, when the voltages at the points 14 and 15 are the same, indicating a correct code, a correct code pulse OK will be generated by operation of the second comparator circuit 25. This circuit includes a triode 36 biased so as to be normally conducting. A voltage which will be one of the steps indicated by 37 on the drawing depending on the number of register toggles operated and thus the number of signals in the information being checked is applied through the varistors 24 to the grid of triode 36, the voltage thus applied representing the higher of the two voltages at the common points 14 and 15 of the summing networks 10 and 11. When the minimum voltage step indicated by 37 is applied to the grid of tube 36, which occurs when the voltages at points 14 and 15 are equal, the bias on the grid of the triode 36 will be reduced below cut off and will thus cause conduction in triode 36 to cease. This will raise the potential of the plate of triode 36 and therefore the potential applied to the grid of a triode 39; triode 39 will then be enabled to conduct upon the appearance of the check pulse 33, at which time a correct code pulse OK will be generated by triode 39. If a correctly coded information message is not applied to registers 16, triode 36 will remain conducting and triode 39 will not conduct on appearance of the check pulse 33.

Therefore in this specific illustrative embodiment of our invention both a correct code pulse OK and an incorrect code pulse NG are generated by different comparator circuits 22 and 25.

The register toggles 16 may advantageously be of the type described in application Serial No. 340,595 filed March 5, 1953, of J. H. McGuigan wherein a related invention is disclosed. Advantageously a reset pulse 40 is applied, as from a reset pulse generator 41, to each of the toggles 16 to cause the toggles to be reset to their normal condition, after the code has been checked.

In the embodiment described above with reference to Fig. 1, $n$ was an even number and $x/n=\frac{1}{2}$. If $n$ is an odd number or $x/n$ is not one half, it is necessary to provide dummy channels to translate artificially the code being checked to a different code wherein $n$ is an even number and $x/n=\frac{1}{2}$. In this manner it is assured that a unique voltage increment will represent the correct information and that no other information will cause this maximum voltage to be transmitted to the amplitude comparator circuit. This translation is attained by providing an artificial channel which is effectively always or never tripped. Turning now to Fig. 2 there is depicted a circuit comprising two summing networks 42 and 43 for checking a two-out-of-five code. Each network 42 and 43 comprises five equal resistors 44 which are connected to register toggles 16, as described above. Additionally network 42 includes two resistors 46 and 47 connected respectively to voltage sources 48 and 49, and network 43 includes a resistor 50 connected to ground. The purpose of these resistors is to provide an artificial translation of the code being checked from a two-out-of-five code to a three-out-of-six code in which one channel is always tripped.

In this manner the correct condition is again one in which exactly half of the channels are tripped. As $n$ in this artificial code is now equal to 6, resistors 46 and 47 and voltages supplies 48 and 49 are so chosen as to increase the voltage at the common point 52 of the network 42 by $\frac{1}{6}$ V; similarly, resistor 50 is so chosen as to decrease the voltage at the common point 53 of network 43 by $1/n$ or, in this case, $\frac{1}{6}$ V, where V, as defined above, is the amplitude of the output pulses of the toggles 15. In one specific embodiment in which V was 60 volts and resistors 44 were 75,000 ohms, resistor 46 was 510,000 ohms, resistor 47 was 750,000 ohms, supply 48 was 300 volts, supply 49 was 150 volts, and resistor 50 was 300,000 ohms.

If a three-out-of-five code is to be checked it can be shown that, for the specific values considered above, resistor 50 should form a part of network 42 and be connected to ground and resistors 46 and 47 should form part of network 43 and be connected to voltage sources 48 and 49, respectively, to provide translation to a checkable three-out-of-six code. In this instance the artificial channel is one which is never tripped.

The translation that is effected by the employment of dummy channels as described above can be generally expressed as a translation from an $x$-out-of-$n$ code to an $(x+a)$-out-of-$(n+b)$ code by adding $a$ operated dummy channels out of a total of $b$ dummy channels added so that $(n+b)=2(x+a)$. If information in a one-out-of-four code is to be checked in a circuit in accordance with our invention a translation will be made by adding two dummy channels, both of which can be considered as always operated, or $a=b=2$. If information in a three-out-of-four code is to be checked, the translation is made by adding two dummy channels, both of which can be considered as never being operated, or $a=0$ and $b=2$.

While specific embodiments of this invention have been described above, it is to be understood that they are merely illustrative of the application of the principles of the invention. Numerous other arrangements may be devised by those in the art without departing from the spirit and scope of the invention.

What is claimed is:

1. A checking circuit comprising a pair of summing networks, each of said networks comprising a plurality of equal impedances and having a common point and each impedance of one network being paired with an impedance of the other network, means for applying voltage steps to said impedances to increase the voltage at the common point of one network and correspondingly decrease the voltage at the common point of the other network in response to the number of pulses of the information message being checked, a pair of comparator circuits, means applying to one of said comparator circuits the lower of said voltages at said common points, means applying to the other of said comparator circuits the higher of said voltages at said common points, means biasing said comparator circuits for operation only when the voltages at said common points are equal, and means dependent on the condition of said comparator circuits for indicating the correctness of said information.

2. A checking circuit comprising a pair of summing networks, each of said networks comprising a plurality of equal impedances having a common point, and each impedance of one network being paired with an impedance of the other network, means for increasing the voltage at the common point of one network and correspondingly decreasing the voltage at the common point of the other network in response to the number of pulses of the information message being checked, an amplitude comparator circuit, means for applying to said comparator circuit the lower of said voltages at said common points, means biasing said comparator circuit for operation only when the voltages at said common points are equal, and means dependent on the condition of said comparator circuit indicating the correctness of said code.

3. A checking circuit in accordance with claim 2 wherein said means for increasing and decreasing said voltages comprises a plurality of register circuits each operable on the appearance of a pulse in said information, a first lead from one of said register circuits to an impedance of one of said summing networks, and a second lead from said register circuit to the paired impedance of the other of said networks.

4. A checking circuit in accordance with claim 2 wherein one of said summing networks comprises another impedance and a source of voltage connected to said impedance, and the other of said summing networks comprises another impedance and means connecting said impedance to ground.

5. A checking circuit comprising a pair of summing networks, each of said networks comprising a plurality of equal impedances having a common point, and each impedance of one network being paired with an impedance of the other network, means for increasing the voltage at the common point of one network and correspondingly decreasing the voltage at the common point of the other network in response to the number of pulses of the information message being checked, an amplitude comparator circuit, means for applying to said comparator circuit the higher of said voltages at said common points, means biasing said comparator circuit for operation only when the voltages at said common points are equal, and means dependent on the condition of said comparator circuit indicating the correctness of said information message.

6. A checking circuit in accordance with claim 5 wherein said means for increasing and decreasing said voltages comprises a plurality of register circuits operable on the appearance of a pulse in said information message, a first lead from one of said register circuits to an impedance of one of said summing networks, and a second lead from said register circuit to the paired impedance of the other of said networks.

7. A checking circuit in accordance with claim 5 wherein one of said summing networks comprises another impedance and a source of voltage connected to said impedance, and the other of said summing networks comprises another impedance and means connecting said impedance to ground.

8. A checking circuit comprising a pair of summing networks, each of said networks comprising a plurality of equal resistors and each resistor of one network being paired with a resistor of the other network, means for maintaining a predetermined voltage on the resistors of one of said networks and a higher predetermined voltage on the resistors of the other of said networks, means for applying a positive pulse to a resistor of said one network in response to the appearance of a pulse in the information message being checked and for applying a negative pulse to the paired resistor of said other network, an amplitude comparator circuit, means for applying the lower of the voltages from said summing networks to said comparator circuit, means biasing said comparator circuit for operation only when said voltages from said networks are equal, and means for providing an indication of the correctness of said information message depending on the condition of said comparator circuit.

9. A checking circuit in accordance with claim 8 wherein one of said summing networks includes another resistor and a source of voltage connected to said resistor and the other of said summing networks includes another resistor and means connecting said resistor to ground, said resistors and said source being determined to translate said code being checked from an $x$-out-of-$n$ code to an $(x+a)$-out-of-$(n+b)$ code where $(n+b)=2(x+a)$, $b$ being the number of channels added and $a$ the number of said added channels operated.

10. A checking circuit comprising a pair of summing networks, each of said networks comprising a plurality of equal resistors and each resistor of one network being paired with a resistor of the other network, means for maintaining a predetermined voltage on the resistors of one of said networks and a higher predetermined voltage on the resistors of the other of said networks, means for applying a positive pulse to a resistor of said one network in response to the appearance of a pulse in the information message being checked and for applying a negative pulse to the paired resistor of said other network, an amplitude comparator circuit, means for applying the higher of the voltages from said summing networks to said comparator circuit, means biasing said comparator circuit for operation only when said voltages from said networks are equal, and means for providing an indication of the correctness of said information message depending on the condition of said comparator circuit.

11. A checking circuit in accordance with claim 10 wherein one of said summing networks includes another resistor and a source of voltage connected to said resistor and the other of said summing networks includes another resistor and means connecting said resistor to ground, said resistors and said source being determined to translate said code being checked from an $x$-out-of-$n$ code to an $(x+a)$-out-of-$(n+b)$ code wherein $(n+b)=2(x+a)$, $b$ being the number of channels added and $a$ being the number of said added channels operated.

12. A circuit for checking information messages in $x$-out-of-$n$ code comprising $n$ register toggle circuits, a pair of summing networks, each of said networks comprising $n$ equal resistors having a common point and each resistor of one network being paired with a resistor of the other network, means for applying the pulses of the information message being checked to said toggle circuits to trip said toggle circuits, means for increasing the voltage on one of said resistors of said one network for each toggle circuit tripped and decreasing the voltage on said paired resistor of said other network, an amplitude comparator circuit, unidirectional current means connected to the common point of each of said summing networks and to said comparator circuit, said unidirectional current means being so poled as to allow passage to said comparator circuit of the lower of the voltages at said common points, means biasing said comparator circuit for operation only when said voltages at said common points are equal, and means for providing an indication of the correctness of said information message on the condition of said comparator circuit.

13. A checking circuit in accordance with claim 12 further comprising a second amplitude comparator circuit, second unidirectional current means connected to said common points and to said second comparator circuit, said second unidirectional current means being so poled as to allow passage to said second comparator circuit of the higher of the voltages at said common points, means biasing said second comparator circuit for operation only when said voltages at said common points are equal, and means for providing an indication of the correctness of said information message depending on the condition of said second comparator circuit.

14. A circuit for checking information messages in an $x$-out-of-$n$ code comprising a pair of summing networks, each of said networks comprising $n$ equal resistors having a common point and each resistor of one network being paired with a resistor of the other network, $n$ register toggle circuits each capable of producing a positive and a negative pulse of V volts when tripped and said toggle circuits maintaining a voltage of B volts on each of said resistors of said one network and a voltage of $B+V$ volts on said resistors of said other network, means for applying the pulses of the information message to said toggle circuits to trip said circuits, means for applying one of said positive pulses to a resistor of said one network when each of said toggle circuits is tripped and one of said negative pulses to said paired resistor of said other network whereby the voltage at the common point of said one network increases by $V/n$ for each toggle circuit tripped and the voltage at the common point of said other network decreases by $V/n$ for each toggle circuit tripped, unidirectional current means connected to each of said common points, said unidirectional current means being connected together for passage therethrough of only the lower of said voltages at said common points, an amplitude comparator circuit, means biasing said circuit for operation on reception from said unidirectional current means of voltages of the order of $B+\frac{1}{2}V$ volts, and means providing an indication of the correctness of said information message being checked depending on the condition of said comparator circuit.

15. A circuit in accordance with claim 14 wherein one of said summing networks includes another resistor and a source of voltage connected to said resistor and the other of said summing networks includes another resistor and means connecting said resistor to ground.

16. A checking circuit in accordance with claim 14 further comprising a second amplitude comparator circuit, second unidirectional current means connected to said common points and to said second comparator circuit, said second unidirectional current means being so poled as to allow passage to said second comparator circuit of the higher of the voltages at said common points, means biasing said second comparator circuit for operation only when said voltages at said common points are of the order of $B+\frac{1}{2}V$ volts, and means providing an indication of the correctness of said information message depending on the condition of said second comparator circuit.

References Cited in the file of this patent

UNITED STATES PATENTS

| Number | Name | Date |
|---|---|---|
| 2,512,038 | Potts | June 20, 1950 |
| 2,622,148 | Van Duuren | Dec. 16, 1952 |